March 25, 1952 — G. T. RANDOL — 2,590,122
FLUID ACTUATED MOTOR CONTROL VALVING
Filed March 22, 1945 — 5 Sheets-Sheet 1
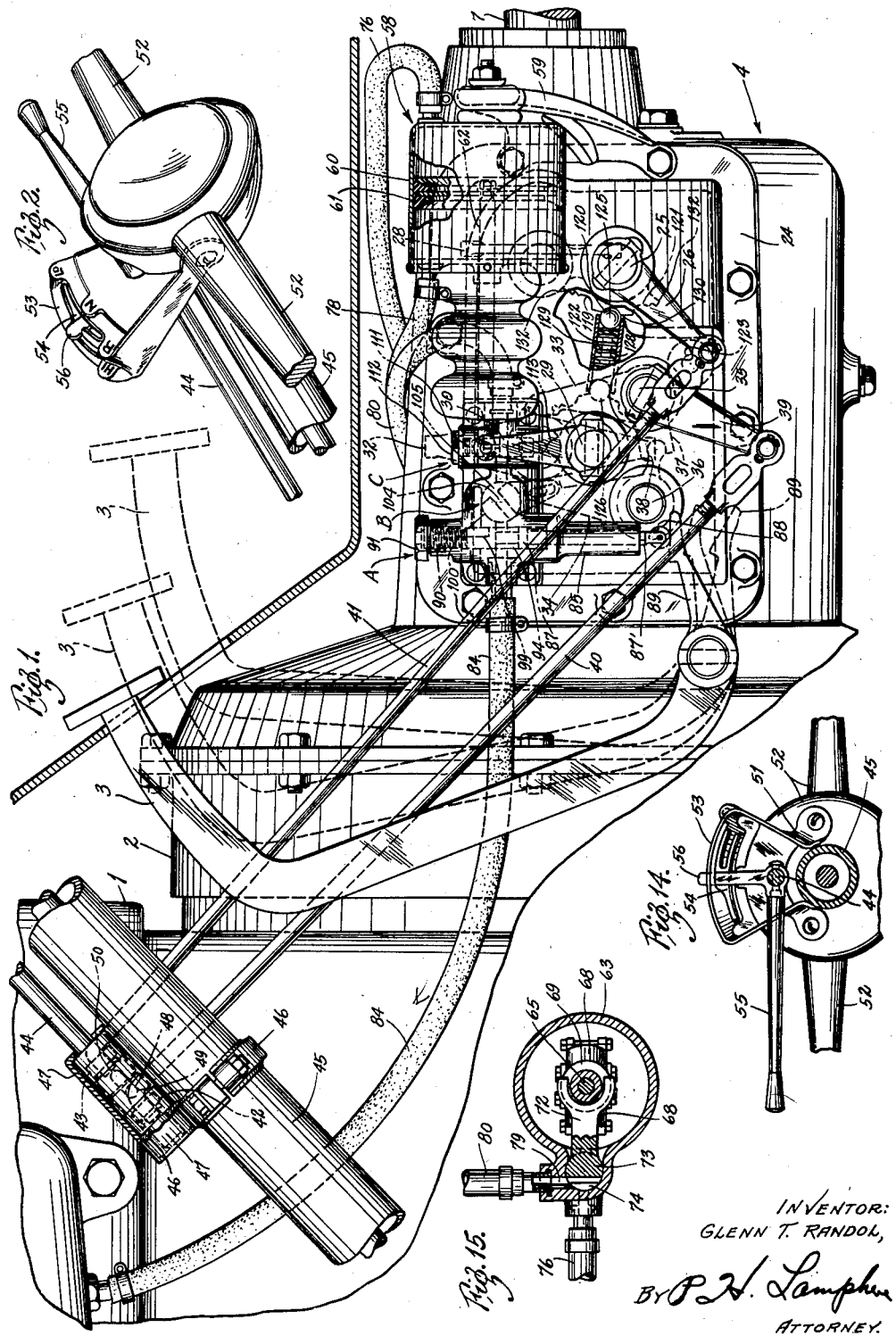
INVENTOR:
GLENN T. RANDOL,
BY P. H. Lamphere
ATTORNEY.

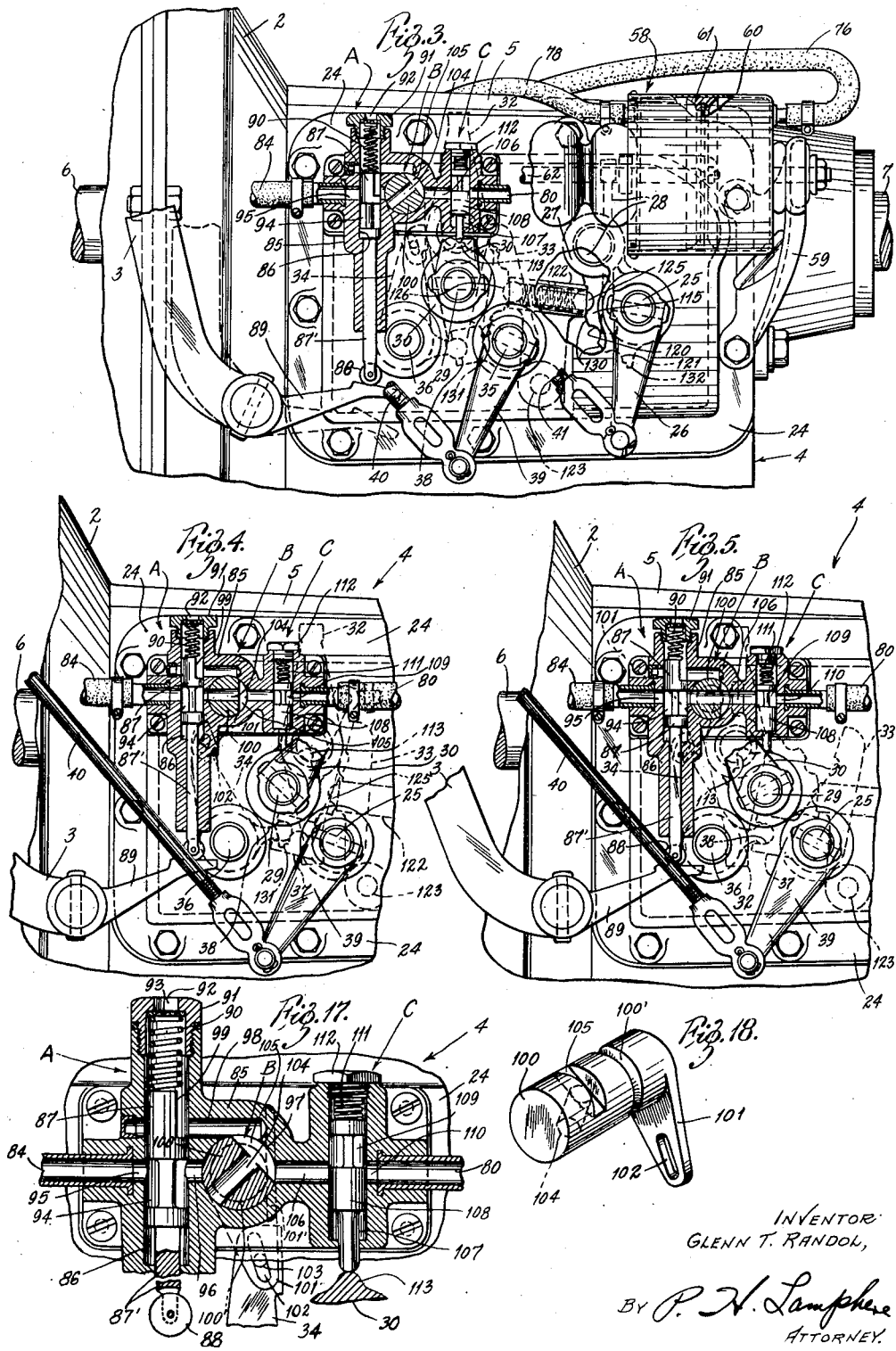

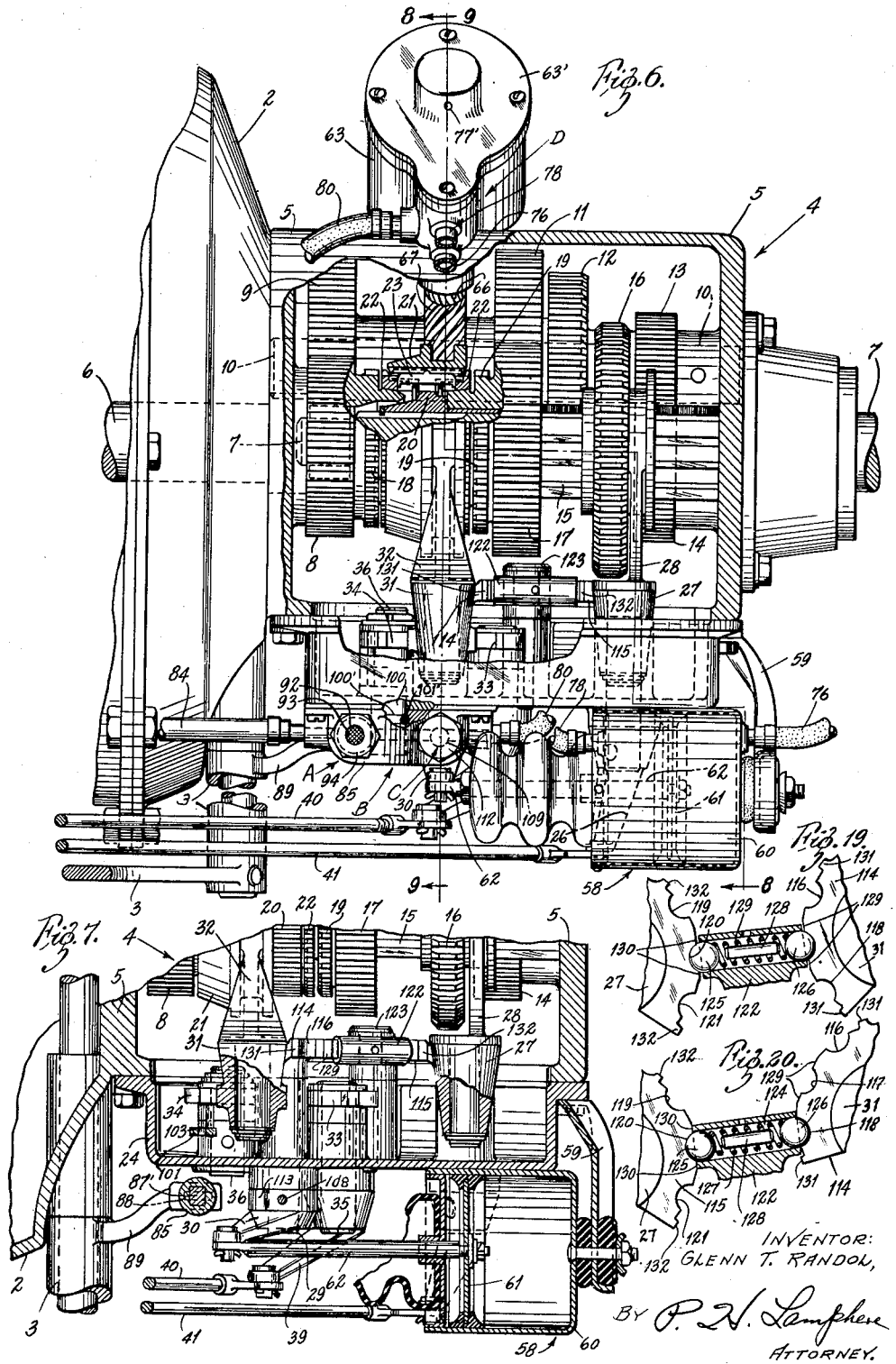

March 25, 1952     G. T. RANDOL     2,590,122
FLUID ACTUATED MOTOR CONTROL VALVING
Filed March 22, 1945     5 Sheets-Sheet 4
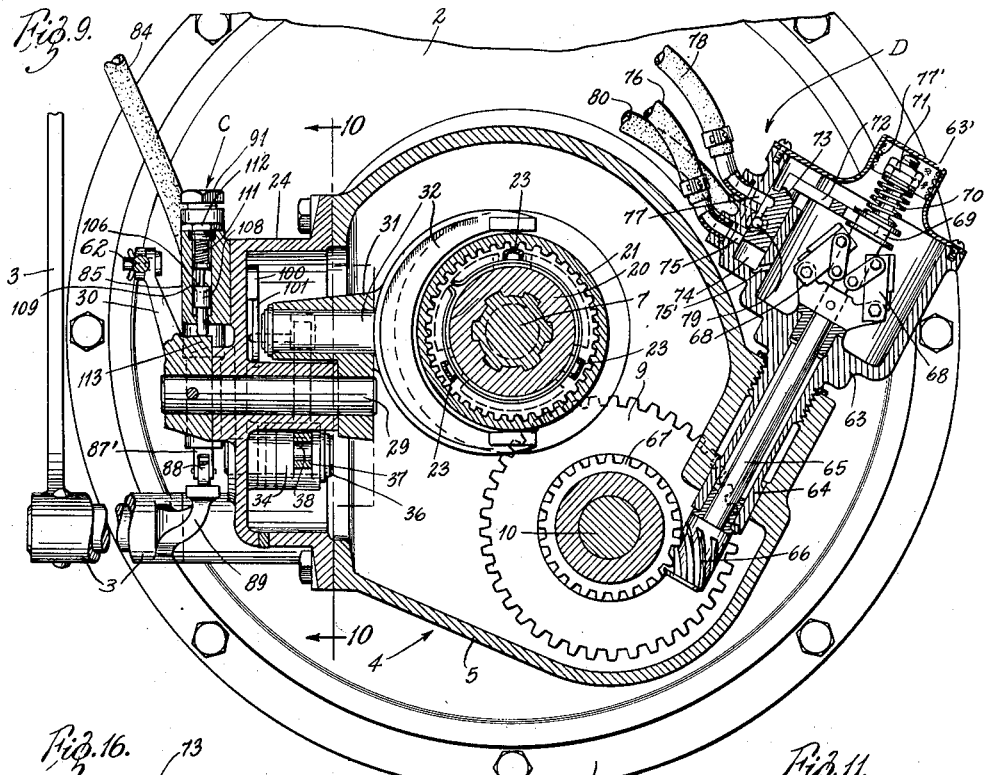
INVENTOR:
GLENN T. RANDOL,
ATTORNEY.

March 25, 1952 G. T. RANDOL 2,590,122
FLUID ACTUATED MOTOR CONTROL VALVING
Filed March 22, 1945 5 Sheets-Sheet 5
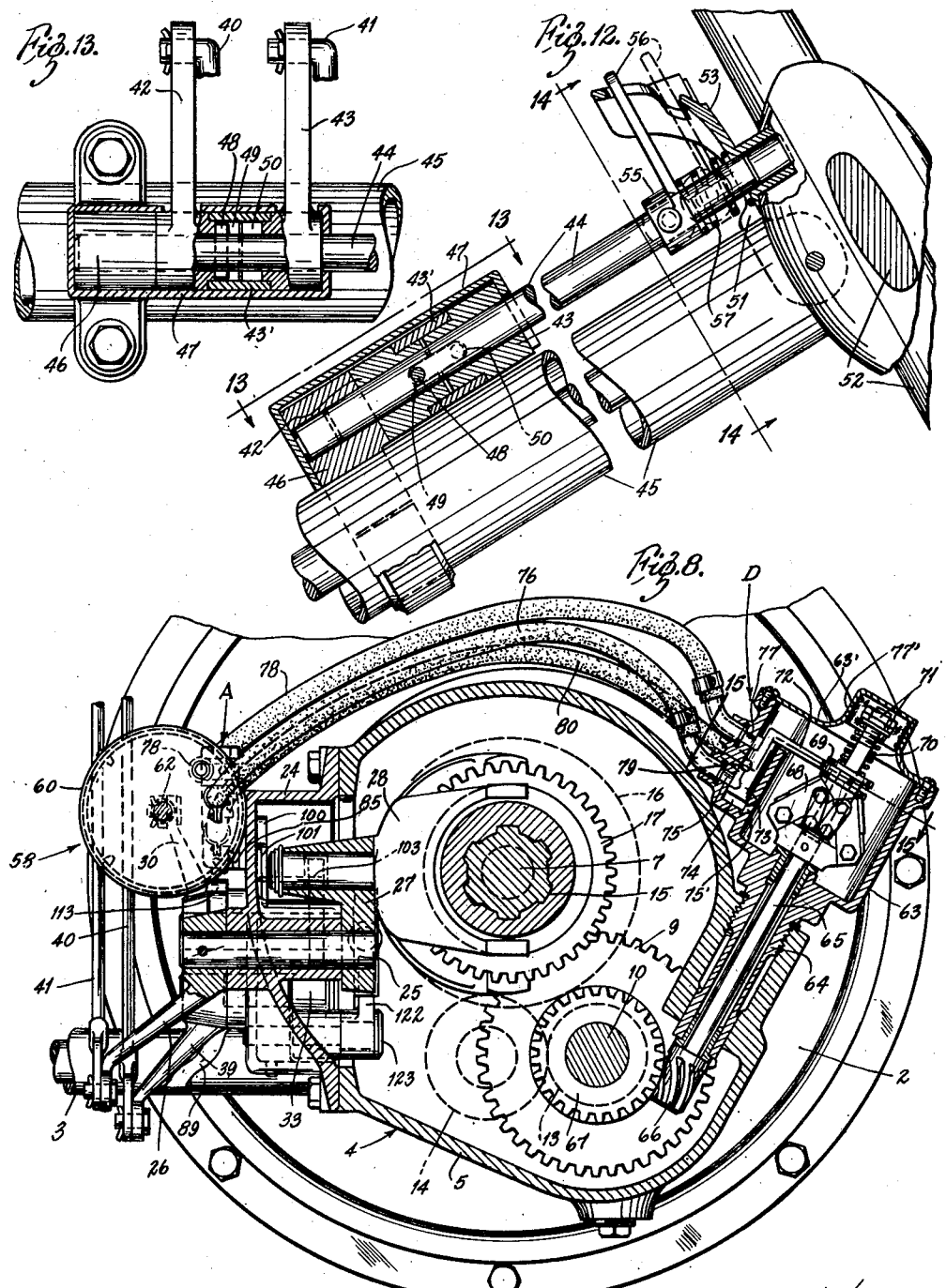
INVENTOR:
GLENN T. RANDOL,
BY P. H. Lamphere
ATTORNEY.

Patented Mar. 25, 1952

2,590,122

UNITED STATES PATENT OFFICE 2,590,122

FLUID ACTUATED MOTOR CONTROL VALVING

Glenn T. Randol, Muncie, Ind.

Application March 22, 1945, Serial No. 584,155

7 Claims. (Cl. 121—38)

This application is a continuation-in-part of my prior U. S. pending application Serial No. 372,048, filed December 28, 1940 for Change Speed Transmission Control Means; and for which, a continuing application Serial No. 518,327, was filed under date of January 15, 1944, now matured as Patent No. 2,386,174 issued October 2, 1945.

The invention covered by the present application is primarily concerned with the valving system for controlling a fluid-pressure operated motor as disclosed in my original application above identified, and relates in particular to the combined fluid restricting and movement resisting valve means for retarding the rate of movement of the movable element of said fluid motor within a predetermined portion of its normal full stroke; and wherein said combined valve means is capable of causing such retardation of the movement of the said fluid motor element by restricting the normally effective fluid pressure acting on said motor element and/or mechanically resisting the movement thereof, said dual functioning valve being directly operable by said fluid motor in a single direction from a predetermined full open and non-resisting position to a full restricting and resisting position.

A primary and important object of the invention is to associate with a fluid-pressure operated motor means having an element movable from one extreme position to another and connected to actuate a member to corresponding positions, a means for causing said motor element and connected member to have a decreasing rate of movement through a portion of their travel intermediate said two extreme positions.

Another object is to associate with a fluid motor operated power means having a movable element for shifting a member between two extreme positions and which requires a slower rate of movement during a portion of its intermediate movement between the said two extreme positions, a plunger valve directly operable in a single direction for causing a decreasing in the rate of shifting movement of the motor movable element and connected member through intermediate portions of their full travel between the said two extreme positions.

Yet another object is to provide novel yieldably resisting means operable for retarding the rate of movement of the movable element of a fluid pressure-operated motor during predetermined portions of its full stroke.

A further important object related to that last stated is the provision of improved retardation mechanism for slowing down the normal rate of movement of a movable element of a fluid-pressure operated device through a predetermined portion of its full stroke by novel cam and spring actuated valve means capable of restricting fluid-pressure flow in unison with affording yieldable resistance to movement of said motor element.

A still further and important object of the invention is to provide improved novel retarding control means for a fluid-pressure operated motor having a movable element, which is responsive to increasing resistance to movement of said motor element with a corresponding reduction in the effective differential pressures therein, said retarding functions being induced directly by operation of the said motor.

Other objects of the invention will become apparent from the following description of the structure embodying my invention as applied in the control of a motor vehicle change speed transmission but not restricted thereto.

In the drawings:

Figure 1 is a side view of a change speed transmission having associated therewith a fluid motor control valve mechanism embodying my invention, the transmission being shown in neutral condition and the valve mechanism moved to full restricting position;

Figure 2 is a perspective view of the steering wheel mounted hand lever and associated indicating bracket;

Figure 3 is a side view similar to Figure 1 with parts in section and the control mechanism in low gear position;

Figure 4 is a partial sectional side view similar to Figure 3, showing the parts in second gear position;

Figure 5 is a sectional view of the same parts shown in Figure 4 but moved to high gear position;

Figure 6 is a top view of the transmission and control mechanism with the gearing in neutral position and the control mechanism set for automatic operation of second and high speeds;

Figure 7 is a view similar to Figure 6, showing the parts moved to high speed position;

Figure 8 is a sectional view taken on the line 8—8 of Figure 6, showing the governor-controlled valve in second gear position;

Figure 9 is a sectional view taken on the line 9—9 of Figure 6 and showing the governor-controlled valve in high gear position;

Figure 10 is a view taken on the line 10—10 of Figure 9, showing certain parts of the control mechanism in neutral position;

Figure 11 is a sectional view of the clutch and synchronizing means for high and second speed gear ratios operated into high speed position;

Figure 12 is a sectional view showing the manner in which part of the control mechanism is mounted on the steering column;

Figure 13 is a view taken on the line 13—13 of Figure 12, parts being shown in section;

Figure 14 is a view taken on the line 14—14 of Figure 12;

Figure 15 is a sectional view of the governor valve, said view being taken on the line 15—15 of Figure 8;

Figure 16 is a perspective view of the governor-controlled valve member;

Figure 17 is an enlarged sectional view of the control valve structure shown in Figure 3, and detailing the three movable valve elements mounted as a unit, and the cam member associated with the motor power means for actuating the combined restricting and resisting valve element;

Figure 18 is a perspective view of the hand-controlled shut-off valve; and

Figures 19 and 20 are enlarged views of the combined interlock and yieldable detent means between the shifting forks as seen in Figure 10.

Referring to Figures 1, 6 and 11, the numeral 1 indicates the engine for driving a motor vehicle, this engine being connected to the wheels of the vehicle by means of the usual friction clutch (not shown) enclosed within the housing 2 and controlled by the clutch pedal 3 and by means of a conventional change-speed gearing generally indicated by the numeral 4. The gearing is connected through suitable shafting and a differential gear to the vehicle driving wheels as is the usual practice. The change-speed gearing is embodied in a housing 5 in which is journaled the driving shaft 6 (connected to one element of the engine clutch) and the axially aligned driven shaft 7. The portion of the driving shaft within the gearing housing has secured thereto a gear 8 constantly meshing with a gear 9 of a cluster of gears mounted on a countershaft 10 journaled in the housing at one side of the driving and driven shafts. The cluster of gears, in addition to the gear 9, includes a second speed gear 11, a low speed gear 12, and a reverse speed gear 13, the latter being in constant mesh with an idler gear 14. A portion of the driven shaft 7 which extends into the housing is provided with splines 15 upon which is slidably mounted a combined low and reverse gear 16, said gear, when moved forwardly, meshing with the gear 12 to obtain low speed ratio, and when moved rearwardly, meshing with gear 14 to obtain reverse gear drive.

The driven shaft 7 ahead of the splined portion has rotatably mounted thereon a second speed gear 17 which is in constant mesh with the second speed gear 11 on the countershaft. The second speed gear 17 is connected to the driven shaft and the driven shaft is connected to the driving shaft in a selective manner by means of a combined clutch and synchronizing means. This structure is well known and need only be briefly described. As best shown in Figures 6 and 11, clutch teeth 18 are provided on the driving shaft and clutch teeth 19 are provided on the gear 17, said teeth being in opposed spaced relation. The portion of the driven shaft between the clutch teeth has secured thereto a splined sleeve 20 having thereon a slidable clutch collar 21 provided with internal teeth for cooperating with the teeth 18 when the sleeve is moved forwardly, or for cooperating with teeth 19 when moved rearwardly. The synchronizing means which is employed to bring either the teeth 18 or 19 and the internal teeth of the collar 21 to substantially the same speed at the time they are engaged comprises synchronizing means, shown as the well known blocking ring type and including the blocking friction ring member 22, one associated with the driven shaft teeth 18 and the other associated with teeth 19 on the second speed gear. Between these two synchronizing members are operating members 23 which lie beneath the clutch collar 21 for operation thereby. Thus when the collar is moved forwardly to engage teeth 18, members 23 will be operated to first operate the synchronizing member 22 to frictionally connect the driving and driven shafts together and then subsequently accommodate movement of the collar through the teeth of the synchronizing member to a position engaging teeth 18. Similarly, when collar 21 is moved rearwardly, members 23 will be operated to move the synchronizing member 22 so as to frictionally connect gear 17 to the driven shaft and then subsequently enable the teeth of the clutch collar to pass through the teeth of the synchronizing member and engage teeth 19. In Figure 6 the clutch collar 21 is disengaged from both teeth 18 and 19 and in Figure 11 the clutch collar is shown as being moved forwardly to a position where the driving shaft is directly connected to the driven shaft.

In accordance with the invention covered by the original application there is provided means for shifting the collar 21 and the combined low and reverse gear 16 in order to properly control the change of gear ratios of the transmission. In the side closure plate 24 for the gearing housing 5 there is journaled a shaft 25 (best shown in Figure 8) which extends to the exterior of the closure plate and has pinned thereto an operating arm 26. The inner end of this shaft has secured thereto, as by welding, an upwardly extending arm 27 in which is journaled a shifting fork 28 engaging in an annular groove in the combined low and reverse gear 16. Thus when the arm 26 is moved to rotate shaft 25 in a counter-clockwise direction, as viewed from the exterior of the closure plate, the shifting fork 28 will be so moved as to place the gear 16 in mesh with the gear 12 to provide low gear ratio and when the arm is turned in the opposite direction, the shifting fork will move to cause the gear 16 to be placed in mesh with the idler gear 14 to obtain reverse gear ratio.

Also journaled in the closure plate forwardly of the shaft 25 is a second shaft 29 (best shown in Figure 9) and secured to the outer end thereof is a second arm 30 for rotating the shaft. The inner end of the shaft has secured thereto, as by welding, an upwardly extending arm 31 in which is pivotally mounted a shifting fork 32 engaging in a groove in clutch collar 21. Thus when the shaft 29 is rotated in a counter-clockwise direction, as viewed from the exterior of the closure plate, collar 21 will be moved forwardly to cause the driving shaft 6 to be connected directly to the driven shaft 7 to provide direct or high gear ratio, and when the shaft 29 is rotated in the opposite direction, the collar will be moved rearwardly to cause gear 17 to be connected to the driven shaft to provide second gear ratio.

As best shown in Figure 10 (a view of the inside of the closure plate) the closure plate 24 has mounted thereon two companion neutralizing levers 33 and 34. The lever 33 is secured to a shaft 35 journaled in the plate, and the lever 34 is rotatably mounted on a pin 36 carried by the plate. These levers extend upwardly on opposite sides of the arm 31 in which the shifting fork 32 is pivotally mounted. The lever 33 is provided with an integral arm 37 and lever 34 is provided with an integral arm 38, the latter having a circular portion for reception in a circular cutout in the former whereby the two levers will be caused to move together and in opposite directions. The levers are rotated by means of an arm 39 on the exterior end of shaft 35. The construction is such that when arm 39 is turned so as to move the levers toward each other, they will cause the shifting fork 32 to be moved to its central or neutral position whereby the clutch collar can be positively disengaged from either teeth 18 or 19 if engaged with either set of teeth. When arm 39 is operated to spread the levers 33 and 34 apart, the shifting fork 32 is then free to be moved by arm 30 and shaft 29. When the levers 33 and 34 are spread apart to their limit of outward travel they will be positioned somewhat beyond the arm 39 when in an operative position. This condition is shown in Figures 4 and 5.

The arm 39 for controlling companion levers 33 and 34, and arm 26 for rotating shaft 25 and moving the combined low and reverse speed gear 16, are both adapted to be controlled from a remote point by means of a single member, said remote point preferably being adjacent to the steering wheel of the vehicle. The means for controlling these two arms is best shown in Figures 1, 2, 12, 13 and 14 and comprise a rod 40 connected to arm 39 and a rod 41 connected to arm 26. These rods extend forwardly and upwardly and are connected at their upper ends to arms 42 and 43 mounted on the lower end of a shaft 44 positioned parallel to the steering column 45. The lower end of shaft 44 is journaled in a bearing 46 for both rotative and sliding movement, said bearing being mounted on the lower end of the steering column. A cover 47 is provided to enclose the bearing 46 and the inner ends of arms 42 and 43, said cover having the further function of maintaining the arms in a fixed axial position. A spacer sleeve 43' is also provided between the hubs of the arms. The shaft 44 is adapted to be selectively connected to the hubs of arms 42 or 43 by a reciprocal movement of said shaft. The structure performing this function comprises a pin 48 carried by the shaft and slots 49 and 50 in the hubs of the arms.

The upper end of shaft 44 is mounted in a bracket 51 in order to have both a rotative movement and a sliding movement with respect to said bracket. This bracket is carried by the steering column just beneath the steering wheel 52. The bracket has a portion 53 which extends forwardly and upwardly beneath the steering wheel and this portion is provided with an h-slot 54. The ends of each leg of the slot are designated by letters "R," "Lo" and "Hi" as clearly shown in Figure 2. The central cross portion of the h-slot at the point wherein the legs meet is designated by the letter "N." The upper end of shaft 44 has secured thereto a handle 55 extending outwardly to the right side of the steering column, and carried by this handle is an integral indicating finger 56 extending into the h-slot. A spring 57 is interposed between lever 55 and bracket 51 in order to normally bias shaft 44 downwardly and to a position wherein pin 48 engages slot 49 to connect the shaft to arm 42. The biasing action of the spring causes the finger to enter the leg of the slot marked "Hi" when the finger is at the "N" position. To connect shaft 44 to arm 43 it is necessary to move shaft 44 upwardly by lifting on the handle and this can only be done when handle 55 is in a position wherein the finger is opposite the "N" position. When the handle is rotated in the direction from the "N" position to place the finger at the end of the leg of the slot marked "Lo," the arm 43 will be operated and through rod 41, arm 26 will be rotated in a counter-clockwise direction, as viewed in Figure 1, to thus shift the combined low and reverse gear 16 to a position wherein it meshes with the low gear 12 on the countershaft, thus giving low speed by means of a manual operation. When handle 55 is moved to a position to place the finger at the end of the slot marked "R," arm 43 of rod 41 will rotate arm 26 in the opposite direction and cause the combined low and reverse speed gear to be moved to a position wherein it meshes with the idler gear 14 and thus cause reverse gear to be obtained. When the handle is moved to place the finger opposite the position marked "N," spring 57 will cause shaft 44 to be moved downwardly so as to connect this shaft to arm 42, this connection being the normal mechanical connection between the shifting handle 55 and the transmission as already noted. When the handle is moved to place the finger 56 at the end of the leg of the slot marked "Hi," arm 39 will be rotated to spread levers 33 and 34 apart, as seen in Figures 4 and 5.

The means employed for shifting clutch collar 21 for obtaining direct drive (high gear ratio) or second gear ratio comprises, by way of example, a suction-operated motor 58 mounted adjacent to the exterior of the closure plate by means of a bracket 59. This motor includes a cylinder 60 having reciprocable therein a piston 61 which is operatively connected by a piston rod 62 to arm 30 for rotating shaft 29 which controls shifting fork 32 for the clutch collar 21. When the piston of the suction motor is centrally positioned in cylinder 60, the shifting fork will be in a central position wherein the clutch collar 21 is disengaged from both teeth 18 and 19. This position of the piston is indicated in Figures 1 and 6 and is the neutral position. When the piston is moved to the forward end of the cylinder, shaft 29 will be so rotated as to cause the shifting fork 32 to move the clutch collar 21 forwardly and connect the driving shaft directly with the driven shaft. When the piston is moved to the rear end of the cylinder, the shifting fork will be so moved as to shift the collar rearwardly and connect the second speed gear 17 to the driven shaft.

The source of suction (fluid pressure) for operating the suction motor is that produced in the intake manifold of the engine 1, and in order to control the suction and properly operate the suction motor to perform the shifting of the clutch collar, there are provided four valves generally indicated by the letters "A," "B," "C" and "D." The valve "A" is adapted to be controlled by clutch pedal 3, the conditioning valve "B" by lever 34 of the two companion neutralizing levers mounted on the inside of the closure plate, the combined restricting and resisting valve "C" which forms the invention covered by this application, is directly actuated by the suction motor which also operates the shifting fork 32, and the governor-controlled valve "D" by a speed-responsive device which is preferably driven from the countershaft of the gearing although it may be driven from the driven shaft of the vehicle if found desirable. In the preferred arrangement of the aforementioned valves the governor-controlled valve "D" is placed next to the suction motor in the line of communication between the engine intake manifold and said motor. The speed-responsive device for controlling this valve is mounted in a casing 63 secured to the side of the transmission housing opposite that of the closure plate 24 (see Figures 8 and 9). The casing is provided with a guide portion 64 screwed into the transmission casing, said guide portion acting as a bearing for a shaft 65 having a gear 66 on its inner end meshing with a gear 67 secured to the cluster of gears on the countershaft between gears 9 and 11. The outer end of shaft 65 lies in the casing 63 and has pivotally mounted thereon governor fly-weights 68 which are connected to a slidable sleeve 69 mounted on shaft 65 and acted on by a spring 70 positioned between the sleeve and adjustable nuts 71. By adjusting the nuts 71 the speed of shaft 65 at which the weights move from their closed position to open position (Figures 8 and 9) can be varied. A cover-plate 63' is attached to casing 63 in which is an atmospheric porthole 77' covered by a screen.

The sleeve 69 is grooved and receives an arm 72 of a valve element 73 slidable in a bore 74 of the housing 63. This bore has a port 75 which is connected by a conduit 76 with the rear end of cylinder 60 of the suction motor. The bore is also provided with a port 77 which is connected by a conduit 78 with the forward end of cylinder 60 of the suction motor. A third port 79 positioned intermediate ports 75 and 77, is connected by a conduit 80 with the valve "C." A passage 75' places the inner end of bore 74 in communication with the interior of casing 63. The valve element 73 (shown in detail in Figure 16) is of cylindrical construction and provided with recesses 81 and 82 adapted to communicate with each other by an intermediate cut-away portion 83. The recesses 81 and 82 are so spaced apart as to selectively connect central port 79 with ports 75 and 77. When the fly-weights 68 are adjacent to the shaft, the valve element will be so positioned that conduit 76 will be connected with conduit 80, thereby placing the rear end of cylinder 60 in communication with the source of suction. These positions of the valves and weights are shown in Figure 8. When the weights 68 are thrown outwardly by a predetermined speed of rotation of the countershaft of the gearing, the valve element will be so positioned that conduit 78 will be connected with conduit 80, thereby placing the forward end of the cylinder of the suction motor in communication with the source of suction. These positions of the valve elements and weights are shown in Figure 9. In practice the position of the fly-weights in Figure 9 will not be obtained until the countershaft is rotating at a speed which is equivalent to about 18 miles per hour vehicular speed. This condition can be varied by adjusting the tension of spring 70.

The three valves "A," "B" and "C" are all mounted as a unit on the exterior of the closure plate 24 and are arranged between conduit 80 leading from the speed-responsive valve "D" and conduit 84 leading to the manifold, valve "A" being closest to the manifold, valve "B" next, and valve "C" third. The relationship between the three valves and their positions on the closure plate is best shown in Figures 3, 4 and 5 whereas Figure 17 shows an enlarged sectional view of the three valves. The valves are all mounted in a single casing 85 which has at its forward end a vertical bore 86 in which valve element 87 of the pedal-controlled valve "A" is reciprocably mounted. This valve element is formed on the end of a square rod 87' which is slidable in a square guide axially aligned with the bore 86. The lower end of the rod carries a roller 88 which is engageable by an arm 89 integral with the clutch pedal 3. The valve element 87 is biased to its lower position by a spring 90 interposed between the valve element and a closure plug 91 which has an air relief opening 92 therein filtered by a screen 93. The valve element 87 is formed with an annular recess 94 for placing the port 95 connected to the conduit 84 leading to the manifold with the passage 96 leading to a bore 97 which is at right angles to bore 86. The bore 97 is also connected by a passage 98 to bore 86 at a point above the passage 96. The valve element 87 also has a cutout portion 99 which places passage 98 to be in communication with the atmosphere through the opening 92 at the upper end of bore 86. This cutout portion is also capable of connecting the passage 96 to the atmosphere when the valve element 87 is in its lower position wherein it is normally biased by spring 90. When in its lower position the valve element also positions the annular recess portion 94 so that port 95 and passage 96 are cut off from communication with each other. The lower position of the valve element 86 is shown in Figure 3, and its upper position is shown in Figures 4, 5 and 17.

The cross-bore 97 receives a cylindrical valve element 100 (shown in perspective in Figure 18) which is the movable valve element of the conditioning valve "B." This valve element carries an arm 101 which is connected to neutralizing lever 34 by means of a slot 102 receiving a pin 103 carried by the lever. The valve element 100 is provided with a cross-passage 104 and a slot 105. A groove 100' cooperates with a stake pin 101' (Figure 17) to hold the valve element in the bore. When the valve is in a position wherein the cross-passage 104 places passage 96 in communication with a passage 106 leading to conduit 80, slot 105 will be in a position to prevent connection between the passage 98 and passage 106. When the valve element is turned in a clockwise direction in order to shut off passages 104 and 96, passage 98 will be in communication with passage 106.

The casing 85 is also provided with a vertical bore 107 with which passage 106 communicates. Within this bore is a valve element 108 which is the movable valve element of the combined restricting and resisting valve "C" which forms the invention being claimed herein. This valve element has an annular recess 109 for controlling communication between the passage 106 and port 110 to which is connected conduit 80 leading from the valve "D." The valve element 108 is normally biased downwardly by an adjustable spring 111 interposed between the valve element and a closure plug 112 adjustable to vary the tension of said spring. The lower end of the valve element projects out of the bore and is adapted to be engaged by a cam lobe 113 formed on the hub of the arm 30 which is secured to shaft 29 (see Figures 7, 9 and 17). This cam 113 when engaging the lower end of valve element 108 moves it upwardly against the bias of spring 111 so as to simultaneously restrict the flow of air between passage 106 and the port 110, and to resist movement of said cam. When cam 113 releases the valve element to move downwardly under the action of spring 111, there will be no restriction of flow of fluid between passage 106 and port 110. The spring 111 can be of varying strengths, depending on whether its function is solely to open the combined valve means, or additionally act as a resistance means to the movement of the cam lobe 113 to thus cause retardation of the movement of the arm 30 and connected movable elements 61 and 62 of the fluid motor 58 in a manner to be described later.

The cam 113 is circumferentially positioned on the periphery of the hub of arm 30 so that it will engage and move the valve element 108 upwardly against the resistance of spring 111 and its fullest restricting open position when the piston 61 of the motor 58 is in its central position which position corresponds to the central neutral position of the clutch collar 21. This condition of the valve element is clearly shown in Figure 17. When the piston is at either extreme end of the cylinder the cam will be to one side or the other of the valve element and thus there will be no restricted fluid flow through passage 106 or any appreciable resistance by spring 111 to movement of the arm 30 and shaft 29. The piston is then operative to establish a gear ratio. The cam has such a contour that as the piston moves from one end of its travel to the other to thereby neutralize an active gear ratio and establish another the restricting effect of the valve element will increase, then decrease; the greatest restricting effect being when the piston is substantially at the center middle point of its travel and the clutch collar 21 is in its central neutral position. All restricting effect will cease at the point wherein the synchronizing action has been completed. Thus it is seen that with the restriction taking place in the manner described, less air can be removed from the motor for a given interval by the source of suction, and consequently there will be a decrease in rate of movement of the piston. This decreased rate of movement of the piston when causing a change in gear ratio drive results in a smooth speed transition to simulate the shifting action resulting from proper manual shifting. By slowing the movement of the piston just before a selected gear ratio is established, the synchronizing means associated with the positive clutch teeth will be operated by a force which continues to increase from the beginning of the synchronizing action to its completion, thereby giving it time to properly function. The result will be a smooth motor power shift without clash of positive teeth engagement and a prolonged life of the synchronizing means and associated gear clutches.

When the spring 111 is made strong it will also be effective in slowing up the movement of the piston as it passes through the central part of its travel from one extreme end of the cylinder to the other, since the lower end of the downwardly biased combined valve element 108 operates in conjunction with the cam lobe 113 as a resistance means for slowing the rate of movement of said cam and motor piston 61 within a predetermined portion of the full stroke of said piston. It is possible to so strengthen the spring and design the cam that such can function as the sole means for slowing of the movement of the piston during movement of the shifting fork through neutral. Such an arrangement is considered within the scope of my invention, and when so used it will be possible to eliminate the restricting function of said valve if desired. Smooth power shifting can therefore be accomplished by solely using the restricting function of valve element 108, or by this restricting function in conjunction with a resisting action of the spring 111, or by resisting action of the spring alone and without the restricting function of the valve element.

In order to prevent either the combined low and reverse gear 16 or the clutch collar 21 from being placed in an operative position when the other is in operative position, I have also embodied in my control mechanism an interlocking mechanism which has combined therewith yieldable detent means for holding either the combined low and reverse gear or the clutch collar in their different operative positions. The structure employed is shown in detail in Figures 10, 19 and 20. The arm 27, to which the shifting fork 28 is pivotally mounted, is provided with a flange 115 and likewise the arm 31, to which the shifting fork 32 is pivoted, is provided with a flange 114. Flange 114 has three recesses 116, 117 and 118, and flange 115 has three recesses 119, 120 and 121. Positioned between the flanges is a T-shaped member 122 pivotally mounted on the inside of the closure plate by a pin 123 (see Figure 10). The cross leg of this member is provided with a bore 124 and carried therein are two balls 125 and 126 between which is interposed a spring 127. The ball 126 is adapted to cooperate with the recesses 116, 117 and 118 and the ball 125 is adapted to cooperate with the recesses 119, 120 and 121. Also interposed between the two balls is a pin 128 which is of such length that only one of the balls can be moved out of a recess at one time.

The flange 114 on each side of recess 117 is provided with flat surfaces 129 lying in a single plane, and likewise flange 115 on each side of the central recess 120 is provided with flat surfaces 130 lying in a single plane. The surfaces on each side of the recesses 116, 118, 119 and 121 are curved and when presented opposite a flat surface, the member 122 is not pivotally movable as when the flat surfaces are opposite each other. These surfaces are adapted to cooperate with the cross leg of member 122 for locking a shifting fork in a neutral position whenever the other shifting fork is moved out of a neutral position to place a transmission element in operative position. This is best shown by reference to Figures 19 and 20. In Figure 19 the parts are in the neutral position of the transmission and, therefore, ball 125 is in the central recess 120 and ball 126 is in recess 117. Under these conditions the member 122 has a predetermined amount of pivotal play between the flat surfaces 129 and 130. However, when arm 31 is, for example, rotated so as to place the clutch collar 21 in high speed position, ball 126 will be placed in recess 118 (Figure 20). Because of the curved contour of the flange 114 on each side of said recess 118, the member 122 will now be forced against the flat surfaces 130 thereby making it impossible for arm 27, which carries flange 115, to be rotated. The same condition would prevail if arm 31 were rotated so as to place ball 126 in recess 116. On the other hand if arm 31 is in neutral position and arm 27 rotated so that ball 125 would rest either in the recess 119 or recess 121, then member 122 would be forced, by the curved contour of flange 115, into engagement with the flat surfaces 129. Under these conditions arm 31 cannot be rotated.

The ends of flange 114 are provided with stops 131 for engagement with the member 122 to limit the relative movement of arm 31 in either direction. Similarly, stops 132 are provided on flange 115 for cooperation with member 122 to limit the rotative movement of arm 27 in either direction. Since balls 125 and 126 are spring-pressed into the recesses, they will tend to hold arms 27 and 31 in all positions they may assume in controlling the transmission.

OPERATION

During low gear ratio driving (and reverse also) the countershaft is rotated with the wheels of the vehicle and, therefore, the flyweights of the governor will have a tendency to be thrown outwardly due to the rotation of shaft 65 upon which they are pivotally mounted. These weights, however, will not be thrown outwardly against the action of spring 70 until the speed of the vehicle reaches a value of approximately 18 miles per hour. As long as the weights remain in their closed position, as shown in Figure 8, the rear end of the suction motor cylinder will be in communication with conduit 80 leading from the manifold through the valves "A," "B," and "C." The forward end of the cylinder of the suction motor 58, due to the position of the valve element 73, will be connected to atmosphere through port 77, casing 63, and atmospheric port 77'. Suction will not be effective in the rear end of the cylinder of the suction motor under these conditions due to the fact that the valve element 87 of valve "A" is in its lower position as shown in Figure 3, this lower position being the normal position of the valve whenever the clutch pedal is in a position to engage the clutch or in depressed to its central position shown in dotted lines in Figure 1. It is only when the clutch pedal is moved beyond the initial clutch-disengaged position and to a position wherein the foot is substantially adjacent to the floorboard (as indicated by full lines in Figure 1) that the valve element 87 of valve "A" is moved upwardly in order to connect the manifold to conduit 80 leading to valve "D" and the two ends of the cylinder of the suction motor. However, it is also to be noted that even with an open condition of valve "A," communication to the suction motor will still be dependent upon the condition of the valve "B" which will always remain closed, as shown in Figure 3, as long as the gear shifting handle 55 is in its neutral position or in either the low or reverse speed position. However, when the gear shifting handle is moved in order to place the indicating finger 56 in the end of the slot marked "Hi," the valve element 100 of valve "B" will be caused to assume an open position as shown in Figures 4 and 5.

Referring now in detail to the operation of the disclosed control valve mechanism embodying my invention, consider the vehicle moving and the transmission in low speed ratio and it is desired to place the transmission in one of its top gear drives (second or direct drive) which is marked "Hi," the clutch is disengaged by moving the clutch pedal to its fully depressed position, shown in full lines in Figure 1, this position being beyond the position wherein the clutch is initially disengaged. Next, the gear shifting handle is moved so that the indicating finger is moved out of the end of the slot marked "Lo" to the "N" position, thus disengaging the combined low and reverse sliding gear 16. When the indicating finger is in the position marked "N," spring 57 will be released to move the shaft 44 downwardly and thus place finger 56 in a position so that it can move into the end of the slot marked "Hi." The action of the spring 57 also disconnects arm 43 from the shaft and connects arm 42 to the shaft. Clockwise rotation of handle 55 now causes arm 42 to be rotated and with it arm 39 through the connecting rod 40. The arm 39 will be moved in a clockwise direction as viewed in Figure 1 and since the companion levers 34 and 35 are controlled by this arm, they will be simultaneously moved away from each other and to the positions shown in Figures 4 and 5. Since the valve element 100 of valve "B" is connected to lever 34, movement of this lever will place said valve element in the position shown in Figures 4 and 5 which causes air from the suction motor to be drawn into the manifold, provided, of course, the valve element 87 of the valve "A" is open which will be the case since the clutch pedal is fully depressed. The moving of valve element 100 to the position shown in Figures 4 and 5 causes slot 105 to be moved to such a position that passage 98 leading to atmosphere will be cut off from conduit 80 leading to the suction motor through valve "D." Thus it is seen that with the clutch pedal fully depressed and the gear shifting handle moved so that finger 56 is in the end of the slot marked "Hi," the manifold will be in direct communication with conduit 80. The valve element 108 of restricting valve "C" will be effective to restrict flow of air from conduit 80 to the manifold since under these conditions the cam 113 will hold the valve element upwardly in the position shown in Figure 17 with the combined valve spring 111 at maximum tension, this being the position corresponding to the neutral position of the clutch collar 21 and its shifting fork 32.

Assuming that the speed of the vehicle is at or below the selected value of 18 miles per hour, then as soon as the gear shifting handle assumes a position wherein the finger is in the end of the slot marked "Hi," the suction of the manifold will be effective to draw air out of the rear end of the cylinder of the suction motor since the valve element 73 of valve "D" is in the position shown in Figure 8. The front end of the cylinder is in communication with the atmosphere and, therefore, the piston of said motor will be moved rearwardly and this will cause arm 30 to be rotated in a clockwise direction as viewed in Figure 1. Rotation of this arm will cause the shifting fork 32 and the clutch collar to be moved rearwardly as viewed in Figure 6. This will cause the synchronizer member to be operated and the teeth of the clutch collar to engage clutch teeth 19 of gear 17 to connect said gear to the driven shaft and thereby obtain second gear ratio. The movement of the piston of the suction motor will be fairly slow at the beginning of the stroke due to the fact that the valve element 108 of valve "C" restricts the flow of air from the suction motor as already described. However, as soon as the shifting fork has been moved a sufficient distance to cause cam 113 to move out from beneath the valve element 108, this valve element will have less restricting action and the air in the suction motor will be pulled out at a greater rate. Thus the piston will apply increasing power which will bring about proper operation of the synchronizer and place the clutch collar in a position to connect the gear to the driven shaft. With the transmission in second gear ratio, the clutch can now be released to cause power to be applied to the driving wheels of the vehicle. When the clutch is released, the valve element 87 of valve "A" is returned to its lower position, thereby cutting off the suction motor from the manifold.

If the speed of the vehicle is above the selected speed of 18 miles per hour when the clutch pedal is fully depressed and the finger of the gear shifting handle is placed in the end of the slot marked "Hi," then the valve element 73 of valve "D" will be in the position indicated in Figure 9 due to the fact that the fly-weights 68 are thrown outwardly against the action of spring 70. This position of valve element 73 results in the forward end of the suction motor being in communication with conduit 80 leading to the manifold instead of the rear end of the cylinder, said rear end now being in communication with the atmosphere through the passage 79, the casing 63, and the atmospheric port 77'. The piston will now be moved forwardly instead of rearwardly and consequently the shifting fork 32 will be shifting forwardly and thus cause the clutch collar 21 to connect the driving shaft directly with the driven shaft. Thus it is seen that high gear will be obtained and the second gear will be "skipped."

If the transmission should be in second speed, as already described, and high speed is then desired, such speed cannot be obtained until the speed of the vehicle reaches a value at or above the selected speed of 18 miles per hour. However, when the speed of the vehicle reaches the correct factor all that is necessary to obtain high speed or direct drive is to depress the clutch pedal fullly beyond the initial clutch-disengaged position. This will cause the valve element 87 of valve "A" to be placed in open position in order to connect the forward end of the cylinder of the suction motor to the manifold to accomplish the shift.

As the piston of the suction motor moves from the extreme rear end of the cylinder to the forward end thereof, it will pass through the central position which is the disengaged or neutral position of the clutch collar 21. As the piston approaches the central position, cam 113 will become operative to move the valve element 108 of valve "C" upwardly and restrict the flow of air between conduit 80 and the manifold. If spring 111 is of considerable strength this spring will have to be compressed by the cam and it will simultaneously offer resistance to movement of the piston as it approaches the center of the cylinder. This will slow up the movement of the piston to provide time for proper operation of the synchronizing means associated with the clutch collar. As soon as the piston begins to approach the forward end of the cylinder, cam 113 will be moving from beneath the valve element 108 so that air can be pulled out of the suction motor at a greater rate to complete the shift. It is thus seen that the restricting action of valve element 108, together with the spring if desired, is very effective in producing a quiet shift without the clashing of teeth by accommodating slower action and time for operation of the synchronizing means. During this slower action and the operation of the synchronizing means there is present an increasing force from the power means. The suction motor will act in a manner closely approximating that which is possible by manual operation of a gear shift lever.

With the transmission in high speed or direct drive, it will remain in this condition as long as the speed of the vehicle is substantially at or above 18 miles per hour. Under these conditions the valve element 73 of valve "B" will always be in a position to connect the forward end of the cylinder of the suction motor with the manifold. Disengaging the clutch will in no way affect the high speed condition. However, if the speed of the vehicle should drop substantially to or below the 18 miles per hour, then the valve element 73 will assume the position shown in Figure 8 and connect the rear end of the cylinder of the suction motor to conduit 80 leading to the manifold. If the clutch pedal is fully depressed under these conditions, the piston of the suction motor will be moved to the rear end of the cylinder and the transmission then placed in second speed condition in a manner already described. Whenever the transmission is shifted from either second speed to high speed drive or from high speed to second speed drive, the restricting valve 108 will always be operated to properly slow down the speed of movement of the piston 61 of the suction motor 58 as it passes through the intermediate portion of its path of travel from one end of the cylinder 60 to the other to produce the desired results already described.

When it is desired to place the transmission in neutral with either second speed or high speed drive operative, all that is necessary is to move the clutch pedal to a position wherein the clutch is either initially disengaged or to its fully depressed position and then move the gear shifting handle to a position where the indicating finger is opposite "N." This will cause the two companion levers 33 and 34 to be moved toward each other and if the transmission is in high, lever 34 will pick up the shifting fork 32 and move the clutch collar to the neutral position. If the transmission is in second speed, neutralizing lever 33 will operate the shifting fork 32 and move the clutch collar to neutral position. As soon as neutralizing lever 34 begins to move toward lever 33, it will rotate valve 100 and cause slot 105 to connect conduit 80 with the atmosphere through conduit 85. Both ends of the cylinder of the suction motor will now be connected to atmosphere irrespective of the operative position of the valve element 73 of valve "D." This will release the piston of the suction motor to be easily moved with the shifting fork 32 to its central position wherein the clutch collar 21 is disengaged. The restricting and resisting valve "C" will then assume the position shown in Figure 17.

It is thus seen from the foregoing description that my improved control means for retarding the movement of a fluid-pressure operated element, provides special advantages whereby the controlled member is "checked" during a portion of its normal rate of travel between two extreme positions thereof. Furthermore, the position of the cam lobe 113 on the hub of arm 30 may be circumferentially located with respect to said hub so that the slowing down movement of the piston and connected member may be made effective through different predetermined portions of its over-all travel between its two extreme positions. This is a highly desirable feature since the member being operated by the fluid pressure motor may require "checking" at other portions of its travel away from an intermediate portion thereof between the two extreme positions. The cam lobe 113 which is directly actuated by the motor 58 is capable of performing separate or dual functions with respect to operating the valve element 108 either as a restricting valve to limit the flow of fluid pressure to said motor or as a yieldable resistance detent, or as a combined fluid flow restricting and mechanically resisting means to cause retardation in the rate of movement of said member and connected motor element through different predetermined portions of their movement between the said two extreme positions.

Being aware of the possibility of modifications in the particular structure herein illustrated and described without departing from the fundamental principles of my invention, I do not intend that its scope be limited except as set forth by the appended claims.

I claim as my invention:

1. In combination with a fluid motor having an element movable reciprocably within a closed cylinder between two extreme positions, a source of fluid pressure different from atmosphere, a first conduit communicating with said source, and additional conduits joining said first conduit to opposite ends of said motor; the improvements which comprise a selecting valve interposed between said additional conduits and said first conduit for selectively connecting one of said additional conduits to the first conduit and the other of said additional conduits with the atmosphere to subject said motor movable element to differential pressure, and a plurality of tandem control valves interposed in said first conduit between said source and said selecting valve including a shut-off valve having an open position for accommodating the flow of fluid therethrough and a closed position, spring means biasing said shut-off valve to closed position, means for opening said shut-off valve against the biasing effect of said spring means, a conditioning valve operable to a first position to vent said conduits therebeyond to said source and to a second position to vent said conduits therebeyond to atmospheric pressure, means for selectively actuating said conditioning valve to its two positions, a restricting valve having a fluid flow control element interposed in said first conduit, spring means biasing said control element toward an open position, cam means actuated by said motor and acting directly on said control element to urge the same toward a closed position against the biasing force of said spring means, said cam means overruling said spring means during actuation of said motor to move said control element to an at least partially closed position to restrict communication of said motor with said source and thereby retard movement of said movable element within said cylinder.

2. In combination with a fluid motor having an element movable reciprocably within a closed cylinder between two extreme positions, a source of fluid pressure different from atmosphere, a first conduit communicating with said source, and additional conduits joining said first conduit to opposite ends of said motor; the improvements comprising a selecting valve interposed between said additional conduits and said first conduit for selectively connecting one of said additional conduits to the first conduit and the other of said additional conduits with the atmosphere, a valve housing having a main fluid passage interposed in said first conduit and a secondary fluid passage communicating with said main passage, and a plurality of valve control elements guided for movement in said housing, including a shut-off valve element operable to a closed position to close said main passage and to an open position to accommodate venting said main passage to said source of fluid pressure while continuously venting said secondary passage to the atmosphere, a conditioning valve element movable to a first position closing said main passage beyond said shut-off valve while establishing communication of said main passage with said secondary passage to vent said main passage to the atmosphere and movable to a second position preventing communication between said passages and cooperating with said shut-off valve to vent said main passage to said source when said shut-off valve is in its open position, a restricting valve element movable with respect to said main passage to control fluid flow therethrough without entirely interrupting the same, spring means biasing said restricting valve element toward its open position, cam means actuated by said motor and acting directly on said restricting valve element to urge the same toward a closed position against the biasing force of said spring means, said cam means overruling said spring means during actuation of said motor to move said control element to an at least partially closed position to restrict communication of said motor with said source, whereby said fluid motor element is selectively actuated to its said extreme positions only when said shut-off valve element is in its open position and said conditioning valve element is in its second position, with the restricting valve element controlling the rate of motor element movement, and the selecting valve controlling the direction of actuation of said element.

3. In combination with a fluid motor having an element movable reciprocably within a closed cylinder between two extreme positions, a source of fluid pressure different from atmosphere, a first conduit communicating with said source, and additional conduits joining said first conduit to opposite ends of said motor; the improvements which comprise a selecting valve interposed between said additional conduits and said first conduit for selectively connecting one of said additional conduits to the first conduit and the other of said additional conduits with the atmosphere to subject said motor movable element to differential pressure, and a plurality of tandem control valves interposed in said first conduit between said source and said selecting valve including a shut-off valve having an open position for accommodating the flow of fluid therethrough and a normal closed position, means for opening said shut-off valve, a conditioning valve operable to a first position to vent said conduits therebeyond to said source and to a second position to vent said conduits therebeyond to atmospheric pressure, means for selectively actuating said conditioning valve to its two positions, a restricting valve having a fluid flow control element interposed in said first conduit, and means actuated by said motor and acting directly on said control element to move said control element to an at least partially closed position to restrict communication of said motor with said source and thereby retard movement of said movable element within said cylinder.

4. In combination with a fluid motor having an element movable reciprocably within a closed cylinder between two extreme positions, a source of fluid pressure different from atmosphere, a first conduit communicating with said source, and additional conduits joining said first conduit to opposite ends of said motor; the improvements which comprise a selecting valve interposed between said additional conduits and said first conduit for selectively connecting one of said additional conduits to the first conduit and the other of said additional conduits with the atmosphere to subject said motor movable element to differential pressure, and a plurality of tandem valves having interconnected fluid flow passages interposed in said first conduit between said source and said selecting valve including a shut-off valve element having an open position for accommodating the flow of fluid therethrough and a closed position, spring means biasing said shut-off valve element to closed position, means for opening said shut-off valve element against the biasing effect of said spring means, a conditioning valve element operable to a first position to vent the passages therebeyond to said source and to a second position to vent the passages therebeyond to atmospheric pressure, means for selectively actuating said conditioning valve element to its two positions, a restricting valve interposed in said passages, spring means biasing said control element toward an open position, cam means actuated by said motor and acting directly on said control element to urge the same toward a closed position against the biasing force of said spring means, said cam means overruling said spring means during actuation of said motor to move said control element to an at least partially closed position to restrict communication of said motor with said source through said passages and thereby retard movement of said movable element within said cylinder.

5. In combination with a fluid motor having an element movable reciprocably within a closed cylinder between two extreme positions, a source of fluid pressure different from atmosphere, a first conduit communicating with said source, and additional conduits joining said first conduit to opposite ends of said motor; the improvements which comprise a selecting valve for selectively connecting one of said additional conduits to the first conduit and the other of said additional conduits with the atmosphere, a valve housing having a main fluid passage interposed in said first conduit and a plurality of valve control elements guided for movement in said housing, including a shut-off valve element operable to a closed position to close said main passage and to an open position to accommodate venting said main passage to said source of fluid pressure, a conditioning valve element movable to a first position closing said main passage beyond said shut-off valve and movable to a second position cooperating with said shut-off valve to vent said main passage to said source when said shut-off valve is in its open position, and a restricting valve element movable with respect to said main passage to control fluid flow therethrough without entirely interrupting the same, whereby said fluid motor element is selectively actuated to its said extreme positions only when said shut-off valve element is in its open position and said conditioning valve element is in its second position, with the restricting valve element controlling the rate of motor element movement, and the selecting valve controlling the direction of actuation of said element.

6. In combination with a fluid motor having an element movable reciprocably within a closed cylinder between two extreme positions, a source of fluid pressure different from atmosphere, a first conduit communicating with said source, and additional conduits joining said first conduit to opposite ends of said motor; the improvements which comprise a selecting valve for selectively connecting one of said additional conduits to the first conduit and the other of said additional conduits with the atmosphere, a valve housing having a main fluid passage interposed in said first conduit and a secondary fluid passage communicating with said main passage, and a plurality of valve control elements guided for movement in said housing, including a shut-off valve element operable to a closed position to close said main passage and to an open position to accommodate venting said main passage to said source of fluid pressure, said shut-off valve element also being movable to a normal position at which both passages are vented to the atmosphere, a conditioning valve element movable to a first position closing said main passage beyond said shut-off valve while establishing communication of said main passage with said secondary passage to vent said main passage to the atmosphere and movable to a second position preventing communication between said passages and cooperating with said shut-off valve to vent said main passage to said source when said shut-off valve is in its open position, a restricting valve element movable with respect to said main passage to control fluid flow therethrough without entirely interrupting the same, spring means biasing said restricting valve element toward its open position, means actuated by said motor and acting directly on said restricting valve element to urge the same toward a closed position against the biasing force of said spring means, said last-mentioned means overruling said spring means during actuation of said motor to move said control element to an at least partially closed position to restrict communication of said motor with said source, whereby said fluid motor element is selectively actuated to its said extreme positions only when said shut-off valve element is in its open position and said conditioning valve element is in its second position, with the restricting valve element controlling the rate of motor element movement, and the selecting valve controlling the direction of actuation of said element.

7. In control valving for a fluid-pressure operated motor having an element movable reciprocably within a closed cylinder between two extreme positions, a source of fluid pressure different from atmosphere, conduit means for connecting said source to opposite ends of said motor cylinder including selecting valve means interposed therebetween for controlling alternate application of said fluid pressure to opposite sides of said motor element to cause said element to reciprocate between said two positions, restricting valve means interposed in said conduit means between said selecting valve means and said source, means biasing said restricting valve means to a predetermined full open position, said restricting valve means being movable in response to actuation of said motor element in a single opposite direction against the force of said biasing means for causing retardation in the rate of normal movement of said motor element through a predetermined movement thereof by simultaneously restricting the effective fluid pressure in said motor cylinder and mechanically resisting the operation thereof, tandem shut-off and conditioning valve means interposed between said source and said restricting valve means, including a shut-off valve element operable to an open position to vent said conditioning valve means to said source and a conditioning valve element operable to an open position in which said restricting valve means and said selecting valve means are vented through said shut-off valve element to said source, and separately actuatable means for operating said shut-off and conditioning valve elements to their respective open positions.

GLENN T. RANDOL.

REFERENCES CITED

The following references are of record in the file of this patent:

UNITED STATES PATENTS

| Number | Name | Date |
|---|---|---|
| 23,310 | Powell | Mar. 22, 1859 |
| 556,476 | Richardson | Mar. 17, 1896 |
| 1,431,248 | Norris | Oct. 10, 1922 |
| 1,471,317 | Emmet | Oct. 16, 1923 |
| 1,639,747 | Nelson | Aug. 23, 1927 |
| 2,039,186 | Pieper | Apr. 28, 1936 |
| 2,092,580 | Kelley | Sept. 7, 1937 |
| 2,129,083 | Carter et al. | Sept. 6, 1938 |
| 2,131,508 | Goodwin | Sept. 27, 1938 |
| 2,175,152 | Hey | Oct. 3, 1939 |
| 2,188,279 | Hey | Jan. 23, 1940 |
| 2,275,944 | Breese | Mar. 10, 1942 |

FOREIGN PATENTS

| Number | Country | Date |
|---|---|---|
| 327,386 | Germany | Oct. 11, 1921 |
| 551,205 | Germany | May 28, 1932 |
| 451,531 | Great Britain | Apr. 29, 1936 |